No. 629,870. Patented Aug. 1, 1899.
G. C. PILLINGER.
ELECTRIC METER.
(Application filed Apr. 10, 1899.)
(No Model.)
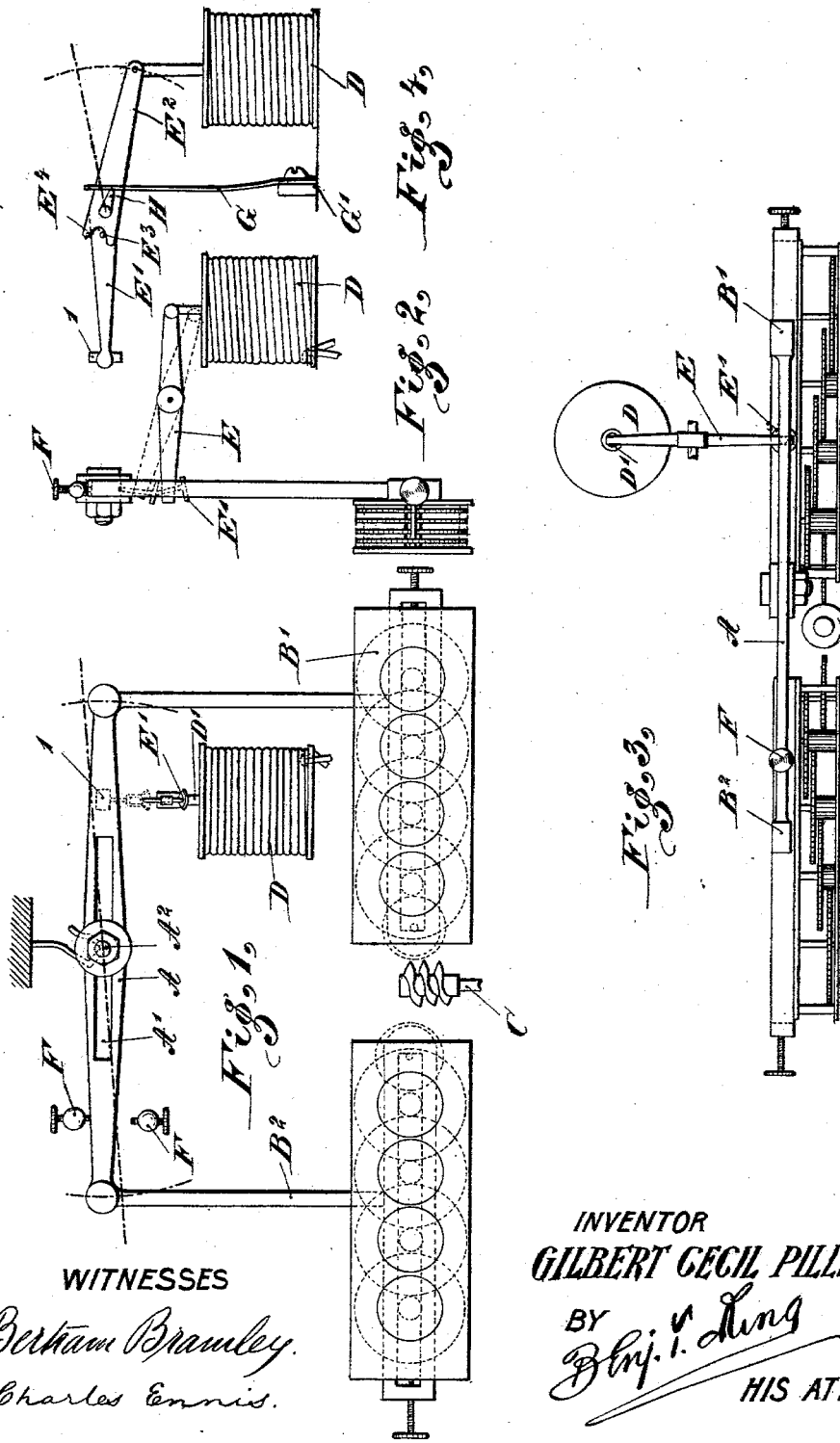
WITNESSES
Bertram Bramley.
Charles Ennis.
INVENTOR
GILBERT CECIL PILLINGER
BY
Benj. T. King
HIS ATTORNEY.

UNITED STATES PATENT OFFICE.

GILBERT CECIL PILLINGER, OF LONDON, ENGLAND.

ELECTRIC METER.

SPECIFICATION forming part of Letters Patent No. 629,870, dated August 1, 1899.

Application filed April 10, 1899. Serial No. 712,485. (No model.)

*To all whom it may concern:*

Be it known that I, GILBERT CECIL PILLINGER, electrical engineer, a subject of the Queen of Great Britain and Ireland, and a resident of Church Lane, Merton Park, London, in the county of Surrey, England, have invented a certain Improved Indicating and Recording Apparatus for Use in Connection with Electric Meters, (for which I have completed an application for patent in Great Britain, No. 10,618, bearing date May 10, 1898,) of which the following is a specification.

My invention relates to indicating and recording apparatus for use in connection with electric meters, and has for its object to provide a simple apparatus which will enable a suitable rebate to be allowed to large consumers of electric current.

My invention consists in separating the record of current-supply in a meter into two parts by means of two recording-trains brought into gear alternately by an electromagnet in such a manner that when the rate of supply of current is below a certain limit all current is recorded on one train and when that limit is exceeded all current is recorded on the other train.

In carrying out my invention I mount, suspend, or otherwise arrange each train of wheels and dials at or about the ends of an arm or carrier which is balanced or pivoted at or about its center and provided with suitable screws or means whereby the position of each set of wheels and dials can be varied relatively to the center or pivot of this supporting arm or carrier. This adjustment is so regulated that when no current is passing the operating mechanism of the meter engages with that train of wheels employed for recording the supply of current when the demand is a minimum one or below a certain amount. A solenoid is arranged in connection with this train of wheels, so that when the current is passing through the meter it passes through the winding of the solenoid and exerts a pull on the core proportional to the amount of current passing. When the pull is sufficient to overcome the force required to raise the end of the balanced arm or carrier, this set of wheels and dials is raised and thrown out of gear with the driving spindle or mechanism of the meter, which in turn is thrown into gear with and engages the other set of wheels and dials employed for recording the supply of current when the demand is above a certain amount.

The apparatus is automatic in its action, each train of wheels being engaged in turn and operated by the driving-spindle of the meter according to the amount of current passing through the meter.

Referring to the accompanying sheet of drawings, which illustrate one method of carrying my invention into effect, Figure 1 is a side elevation of my improved apparatus. Fig. 2 is an end elevation; Fig. 3, a plan of the same, and Fig. 4 shows a modified form of my invention.

I provide a beam or arm A, having a slot A' to carry the pivot A², which is adjusted by means of a screw-nut and washer along the beam or arm A. At each end of the beam I rigidly support the recording-trains B' and B², which are of any ordinary type. The beam is so adjusted by setting the position of the pivot A² that under the action of gravity one of the recording-trains B' is in gear with the spindle C of a meter—say a motor-meter, for example.

A solenoid D is provided, whose core D' is suspended from one end of a lever-arm E. The other end of the latter engages with the beam A through a screw E'. The solenoid D may consist of a few turns of thick wire in series, and therefore carry the whole current which is being measured, or it may be wound and connected in any other manner such that the current in D is proportional to the whole current being measured at any time.

Stop-screws F may be provided to limit the travel of the beam A.

When the current is below, say, five amperes in a ten-ampere meter, it is all being recorded on the train B'; but when the current exceeds five amperes the core D' is attracted thereby, raising the screw E' and the beam A and causing the train B' to pass out of gear with the meter-spindle C and the train B² to pass into gear with the same.

A modified arrangement may be provided to prevent the possibility of the meter-spindle being for any appreciable time out of gear with both of the recording-trains, such as is shown in Fig. 4. A blade-spring G is fixed to the meter-frame at G' and presses against an arm H, fixed to one part E² of the lever E. This lever E is made in two parts E' and E², both pivoted at the center, but each capable of a certain amount of motion independently of one another. A pin E³ is fixed in the part E' and the other part E² is provided with a forked end E⁴. A slot I is provided in the beam A, in which works the end of the arm E'. The arrangement is shown in Fig. 4 in the position it would be in when the recording-train B² is in gear—that is, when the current is in excess of the fixed limit. When the current falls below that limit, the core of the solenoid rises and with it the arm H. This arm H is operated by the spring G as soon as it passes the center, and it then pulls down the beam and changes the recording-train. With this arrangement of solenoid and levers the beam A should be in neutral equilibrium or should be somewhat frictional, so that it does not move till it is moved by the spring G.

Having now particularly described and ascertained the nature of my said invention and in what manner the same is to be performed, I declare that what I claim is—

1. In combination with an electric meter, a suitably-pivoted beam, a pair of recording-trains carried thereby so that either may be operated by the meter-spindle, and an electromagnet influenced by the current being measured and adapted to operate the beam, substantially as described.

2. In combination with an electric meter, an adjustably-pivoted beam, a pair of recording-trains depending from the ends thereof so that either may be engaged by the meter-spindle, and an electromagnet influenced by the current being measured and adapted to operate the beam, substantially as described.

3. In combination with an electric meter, a suitably-pivoted beam, a pair of recording-trains carried thereby so that either may be operated by the meter-spindle, a suitably-pivoted lever with one end engaging the beam, and a solenoid influenced by the current being measured and having its core connected to the other end of the lever, substantially as described.

4. In combination with an electric meter, a suitably-pivoted beam, a pair of recording-trains carried thereby so that either may be operated by the meter-spindle, a lever consisting of two parts suitably pivoted to permit of limited free movement of each, an arm on one part, a spring bearing on the arm, said lever being connected at one end to the beam, and a solenoid influenced by the current being measured and having its core connected to the other end of the lever, substantially as described.

In witness whereof I have hereunto set my hand in presence of two witnesses.

GILBERT CECIL PILLINGER.

Witnesses:
ROBT. HUNTER,
ROBERT BOUCHER MOODY.